United States Patent
Yen

(10) Patent No.: US 11,272,101 B2
(45) Date of Patent: Mar. 8, 2022

(54) WIDE ANGLE CAMERA

(71) Applicant: GUANGZHOU LUXVISIONS INNOVATION TECHNOLOGY LIMITED, Guangzhou (CN)

(72) Inventor: Shih-Chieh Yen, New Taipei (TW)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 17/113,116

(22) Filed: Dec. 7, 2020

(65) Prior Publication Data

US 2021/0185226 A1 Jun. 17, 2021

(30) Foreign Application Priority Data

Dec. 17, 2019 (CN) .......................... 201911303958.7

(51) Int. Cl.
| | |
|---|---|
| H04N 5/232 | (2006.01) |
| G01J 3/02 | (2006.01) |
| G01J 3/28 | (2006.01) |
| H04N 5/225 | (2006.01) |

(52) U.S. Cl.
CPC ........ H04N 5/23238 (2013.01); G01J 3/0208 (2013.01); G01J 3/2823 (2013.01); H04N 5/2254 (2013.01); G01J 3/0248 (2013.01)

(58) Field of Classification Search
CPC ............. H04N 5/23238; H04N 5/2254; H04N 5/2258; G01J 3/0208; G01J 3/0248
See application file for complete search history.

(56) References Cited

U.S. PATENT DOCUMENTS

| | | | | |
|---|---|---|---|---|
| 8,139,125 | B2* | 3/2012 | Scherling | H04N 5/2254 348/231.99 |
| 2009/0195639 | A1* | 8/2009 | Toyoda | G03B 37/04 348/36 |
| 2014/0111607 | A1* | 4/2014 | Scherling | H04N 5/2624 348/36 |
| 2015/0373262 | A1* | 12/2015 | Georgiev | G03B 17/00 348/218.1 |
| 2019/0349523 | A1* | 11/2019 | Song | H04N 5/23229 |
| 2020/0059584 | A1* | 2/2020 | Choi | H04N 5/2254 |

* cited by examiner

*Primary Examiner* — Maurice C Smith

(57) ABSTRACT

A wide-angle camera comprises a spectroscopic module, a first imaging module, and a second imaging module. The spectroscopic module comprises a spectroscopic lens holder, a first optical prism, and a second optical prism. The first optical prism is disposed on a first sidewall of the spectroscopic lens holder. The second optical prism is disposed on a second sidewall of the spectroscopic lens holder. The first sidewall is opposite to the second sidewall. An external light is split into a first light and a second light correspondingly through the first optical prism and the second optical prism. The first imaging module corresponds to the first optical prism and receives the first light for generating a first image. The second imaging module corresponds to the second optical prism and receives the second light for generating a second image. The first image and the second image are synthesized into a wide-angle image.

16 Claims, 6 Drawing Sheets

WIDE ANGLE CAMERA

CROSS-REFERENCE TO RELATED APPLICATION

This application claims the priority benefit of Chinese Patent Application Serial Number 201911303958.7, filed on Dec. 17, 2019, the full disclosure of which is incorporated herein by reference.

BACKGROUND

Technical Field

The present disclosure relates to the technical field of camera devices, particularly to a wide-angle camera.

Related Art

Wide-angle images are generally captured by cameras equipped with wide-angle lenses or fisheye lenses. As providing an exaggerated perspective view, on the edges of the wide-angle image often presented an image "shrinkage" and on the center presented an image "swell". Hence, across the overall image presented a distortion in a shape of wooden barrel, which is called barrel distortion, or a negative distortion, who is mainly resulted from aberrations. Concerning different refractive index of different color of light, the distance between the imaging point of each color light and the optical axis after it is refracted by the lens is different from that of other color light when the light passes through the lens; also, the lateral magnification is different. When the angle of view of a wide-angle lens is greater than 100 degrees, the edges of the image would present distortion.

SUMMARY

The embodiments of the present disclosure provide a wide-angle camera to solve the problem of barrel distortion of wide-angle images captured with wide-angle lenses.

The present disclosure provides a wide-angle camera, comprising a spectroscopic module, a first imaging module, and a second imaging module. The spectroscopic module comprises a spectroscopic lens holder, a first optical prism, and a second optical prism. The first optical prism is disposed on a first sidewall of the spectroscopic lens holder. The second optical prism is disposed on a second sidewall of the spectroscopic lens holder. The first sidewall is opposite to the second sidewall. An external light is split into a first light and a second light correspondingly through the first optical prism and the second optical prism. The first imaging module corresponds to the first optical prism and receives the first light for generating a first image. The second imaging module corresponds to the second optical prism and receives the second light for generating a second image. The first image and the second image are synthesized into a wide-angle image. The spectroscopic module moves relative to the first imaging module or/and the second imaging module.

In the embodiments of the present disclosure, the barrel distortion of wide-angle images can be solved by the procedure of split the external light into the first light and the second light after passing through the first optical prism and the second optical prism of the spectroscopic module; the first imaging module and the second imaging module with narrow perspectives respectively generate a first image and a second image; and synthesize the first image and the second image to form a wide-angle image.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . ." does not exclude other same elements existing in the process, the method, the article, or the device which includes the element.

Figure 1:
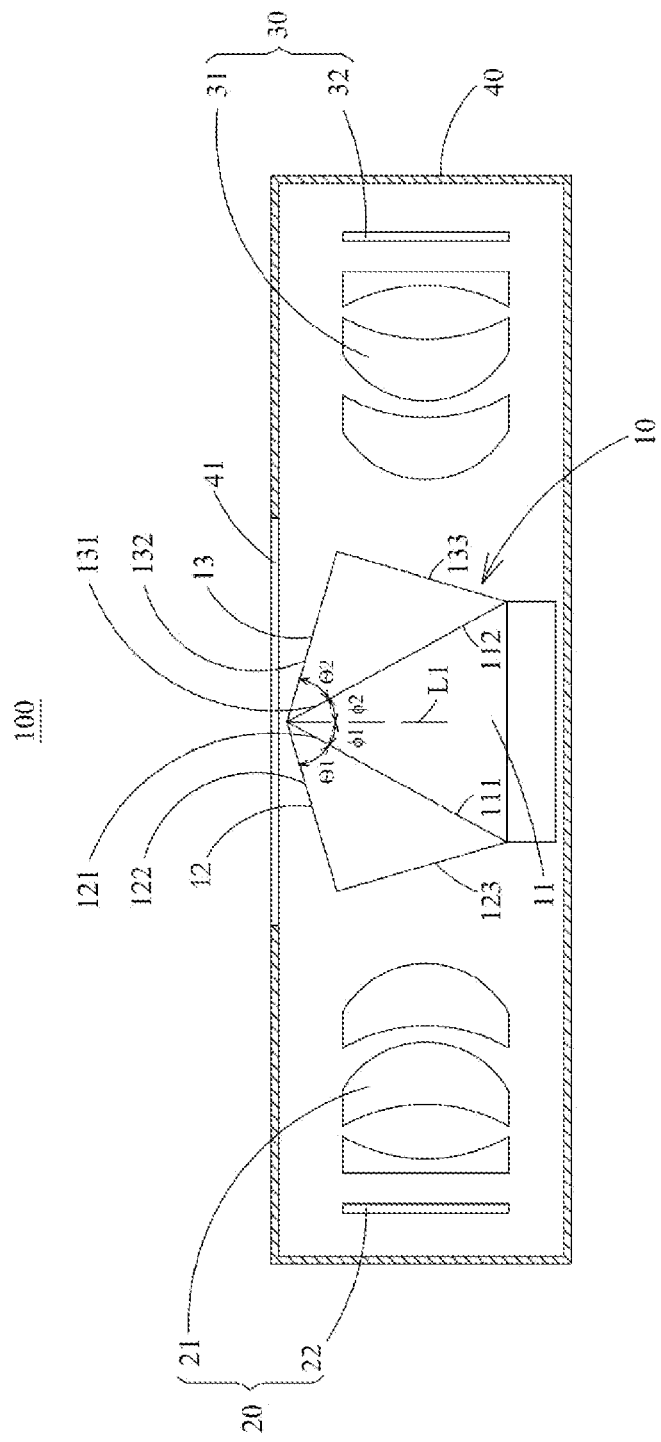
FIG. 1 is a perspective view of a wide-angle camera of the first embodiment of the present disclosure.
Figure 2:
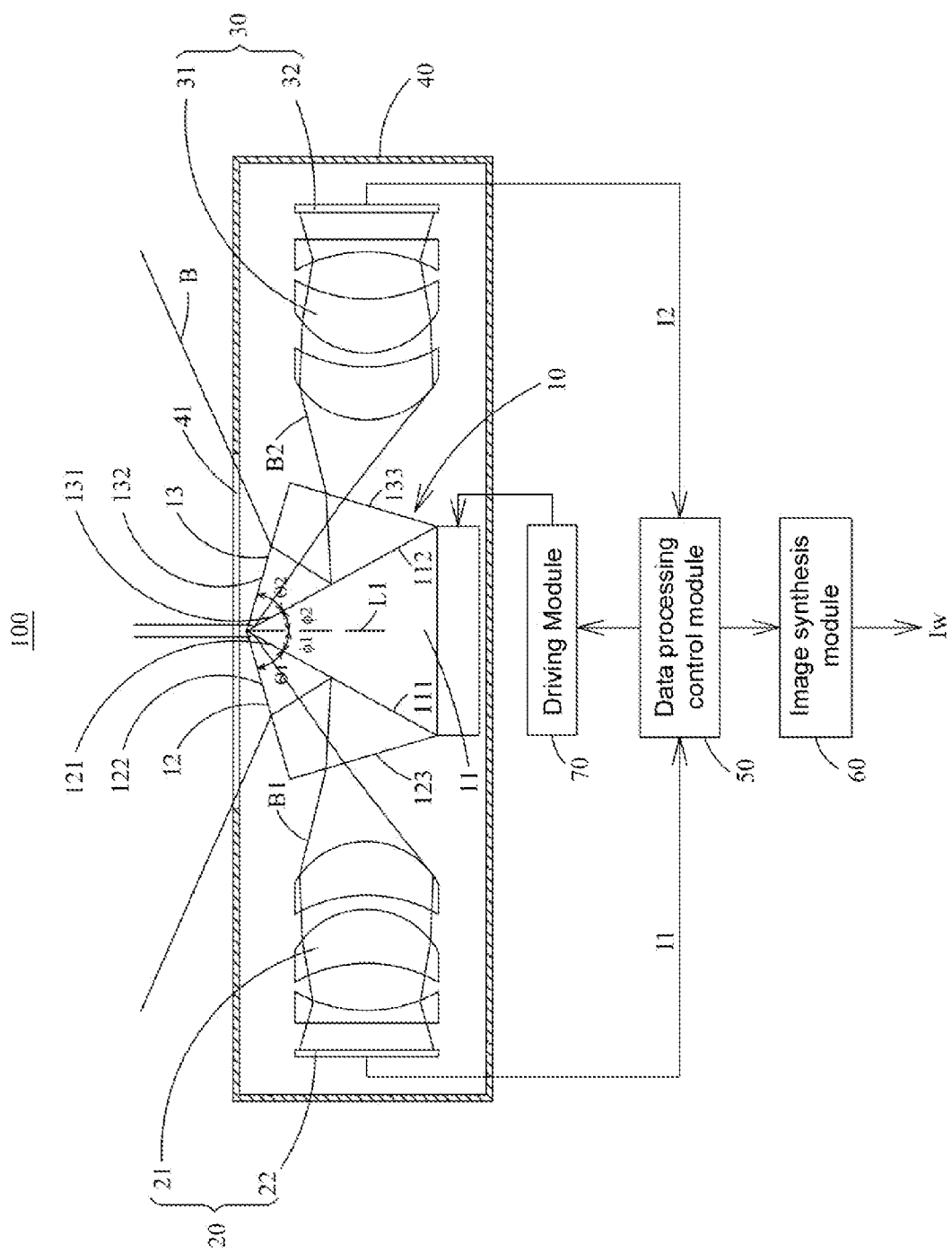
FIG. 2 is a use state diagram of the wide-angle camera of the first embodiment of the present disclosure.

FIG. 1 and FIG. 2 are perspective view and use state diagram of a wide-angle camera of the first embodiment of the present disclosure. As shown in the figures, the present embodiment provides a wide-angle camera 100 for generating wide-angle images, which comprises a spectroscopic module 10, a first imaging module 20, and a second imaging module 30. The spectroscopic module 10 comprises a spectroscopic lens holder 11, a first optical prism 12, and a second optical prism 13. The first optical prism 12 is disposed on a first sidewall 111 of the spectroscopic lens holder 11. The second optical prism is disposed on a second sidewall 112 of the spectroscopic lens holder 11. The first sidewall 111 is opposite to the second sidewall 112. The first imaging module 20 corresponds to the first optical prism 12 and receives the first light B1 for generating a first image I1. The second imaging module 30 corresponds to the second optical prism 12 and receives the second light B2 for generating a second image I2. The first image I1 and the second image I2 are synthesized into a wide-angle image Iw. The spectroscopic module 10 moves relative to the first imaging module 20 or/and the second imaging module 30.

In this embodiment, the spectroscopic module 10, the first imaging module 20, and the second imaging module 30 could be installed in the housing 40, which comprises an opening 41. The spectroscopic module 10 is disposed at a position adjacent to the opening 41. A light channel is provided on two sides of the spectroscopic module 10, and the first imaging module 20 and the second imaging module 30 are respectively installed in each of the light channels. After entering the wide-angle camera 100 through the opening 41, an external light B is split into the first light B1 and the second light B2 by the spectroscopic module 10. The first light B1 and the second light B2 enter the first imaging module 20 and the second imaging module 30 through the light channels on two sides of the spectroscopic module 10, respectively. The housing 40 is presented as an example only, and the present disclosure would not limited to the structural configuration of the housing 40 described above. The detailed structure of the spectroscopic module 10, the first imaging module 20, and the second imaging module 30 would be described below.

In this embodiment, the spectroscopic lens holder 11 is an elongated cylindrical body with a triangular cross section (triangular prism). The first sidewall 111 and the second sidewall 112 are respectively two inclined walls of the spectroscopic lens holder 11. The two light channels in the housing 40 correspond to the first sidewall 111 and the second sidewall 112 of the spectroscopic holder 11.

Besides, in this embodiment, the first optical prism 12 and the second optical prism 13 are prisms, for example, right angle prisms made of glass or plastic. An inclined surface of the first optical prism 12 is disposed on the first sidewall 111 to form a first reflective surface 121. With respect to two side surfaces of the first optical prism 12, the one adjacent to the opening 41 is the first incident surface 122 where the external light B enters, and the one adjacent to the first imaging module 20 is the first emergent surface 123 where the first light B1 exits. The first reflective surface 121 and the first incident surface 122 form a first angle θ1. An inclined surface of the second optical prism 13 is disposed on the second sidewall 112 to form a second reflective surface 131. With respect to two side surfaces of the second optical prism 13, the one adjacent to the opening 41 is the second incident surface 132 where the external light B enters, and the one adjacent to the second imaging module 30 is the second emergent surface 133 where the first light B2 exits. The second reflective surface 131 and the second incident surface 132 form a second angle θ2. In this embodiment, the first angle θ1, and the second angle θ2 are 45 degrees. In other embodiments, the first angle θ1 and the second angle θ2 can be 30 degrees or 60 degrees. By using the first optical prism 12 and the second optical prism 13 with first angle θ1 and second angle θ2 (θ1 is different from θ2), the incident light can be refracted in different directions to become the first light B1 and the second light B2 reflected in different directions, which can be adapted to the first imaging module 20 and the second imaging module 30 disposed in different positions. The first angle θ1 is between 30 degrees and 60 degrees, and the second angle θ2 is between 30 degrees and 60 degrees.

Besides, a light incident direction L1 to the wide-angle camera 100 of this embodiment is defined as a direction perpendicular to the opening 41. The first sidewall 111 and the light incident direction L1 form a first inclination angle φ 1. The second sidewall 112 and the light incident direction L1 form a second inclination angle φ 2. In this embodiment, the first inclination angle φ 1 is identical to the second inclination angle φ 2, for example, the first inclination angle φ 1 and the second inclination angle φ 2 are both 30 degrees. In other embodiments, the first inclination angle φ 1 can be different from the second inclination angle φ 2. That is, the first sidewall 111 and the second sidewall 112 could have different degrees of inclination. This would similarly generate the first light B1 and the second light B2 reflected in different directions to be adapted to the effects of the first imaging module 20 and the second imaging module 30 in different positions.

After the external light B passes through the opening 41, it is split into a first light B1 and a second light B2 by the first optical prism 12 and the second optical prism 13. The first light B1 and the second light B2 enter the light channel described above, then respectively enter the first imaging module 20 and the second imaging module 30.

The first imaging module 20 comprises a first lens group 21 and a first light sensor 22. The first light B1 passes through the first lens group 21 and then images on the first light sensor 22 to generate a first image I1. The second imaging module 30 comprises a second lens group 31 and a second light sensor 32. The second light B2 passes through the second lens group 31 and then images on the second light sensor 32 to generate a second image I2. The perspective of the first lens group 21 can be limited between 70 degrees and 80 degrees, and similarly, the perspective of the second lens group 31 can also be limited between 70 degrees and 80 degrees to avoid the barrel distortion of the first image I1 and the second image I2 as in the prior art with a greater perspective. In this way, the first image I1 and the second image I2 can be synthesized to obtain a wide-angle image without barrel distortion. The first light sensor 22 could be a color light sensor, a monochromatic light sensor, or a time-of-flight sensor (ToF sensor), and the second light sensor 32 could also be a color light sensor, a monochromatic light sensor, or a time-of-flight sensor. Thus, the first light sensor 22 and the second light sensor 32 could both be color light sensors, or the first light sensor 22 is a color light sensor as the second light sensor 32 is a monochromatic light sensor, or the first light sensor 22 is a color light sensor and the second light sensor 32 is a time-of-flight sensor.

The first image I1 and the second image I2 can be respectively transmitted to the data processing/control module 50, and then can be transmitted to an image synthesis module 60 after receiving by the data processing/control module 50. The image synthesis module 60 synthesizes the first image I1 and the second image I2 into a wide-angle image Iw. For example, the image synthesis module 60 can overlaps the same part of the first image I1 and the second image I2 to produce a wide-angle image Iw.

Besides, this embodiment is further provided with a driving module 70 drives the spectroscopic module 10, which configured to be movable relative to the first imaging module 20 or the second imaging module 30. For example, guiding grooves and guiding rails can be provided on the housing 40 and the spectroscopic module 10, respectively. When a guiding groove is provided on the housing 40, a guiding rail is provided on the spectroscopic module 10, and the housing 40 is connected with the spectroscopic module 10 through the coordination of the guiding rail and the guiding groove. The guidance through the structure that the guiding groove cooperated with the guiding rail is driven by the driving module 70 to linearly drive the spectroscopic lens holder 11. Alternately, the spectroscopic lens holder 11 is pivotally connected to the housing 40, and the spectroscopic lens holder 11 is driven by the driving module 70 to rotate around the pivot axis.

Figure 3:
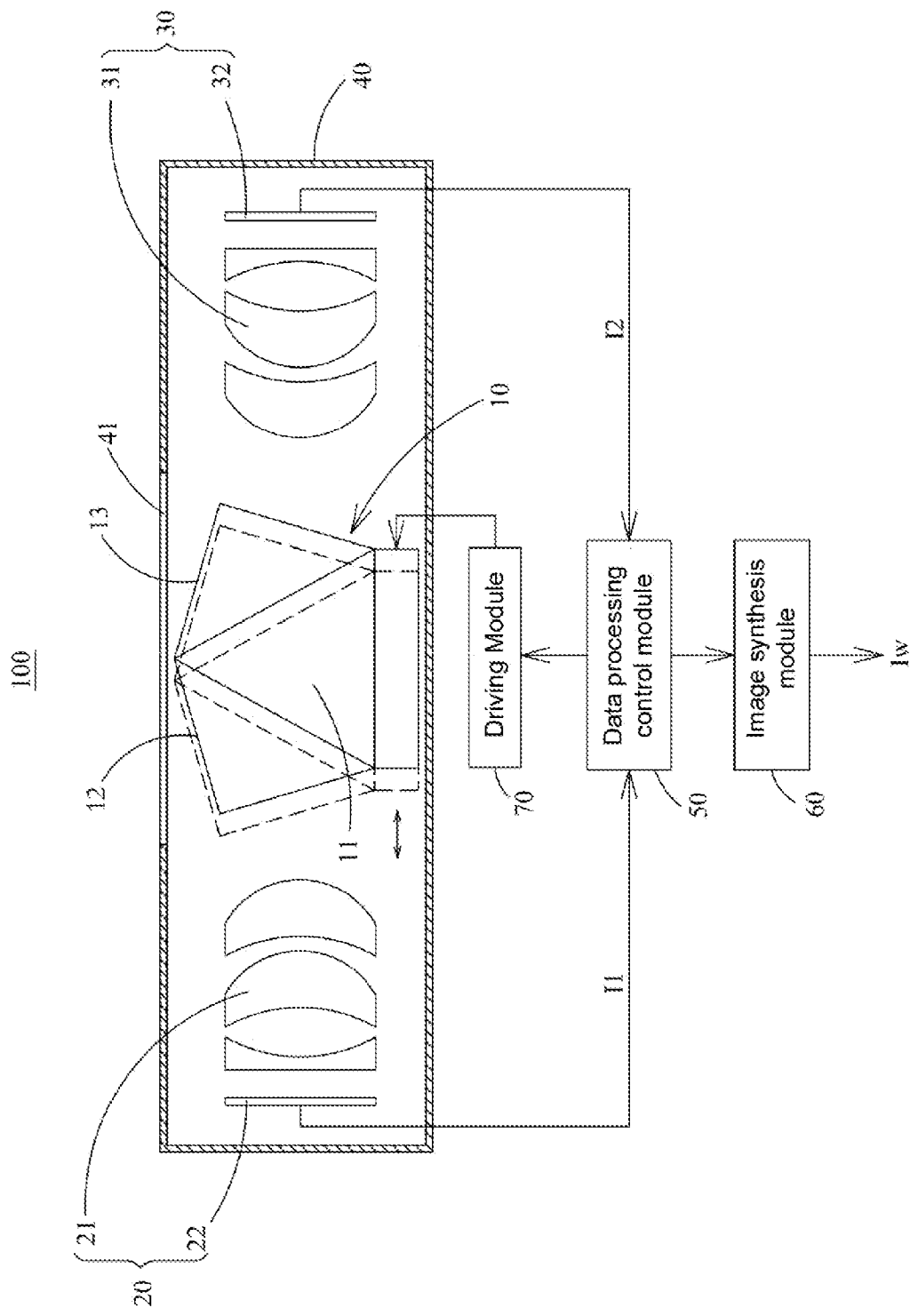
FIG. 3 is a use state diagram of a wide-angle camera of the second embodiment of the present disclosure.

FIG. 3 is a use state diagram of a wide-angle camera of the second embodiment of the present disclosure. Partial components of this embodiment are identical to those of the first embodiment, and the same components are given the same symbols, and descriptions are omitted. In this embodiment, the driving module 70 can drive the spectroscopic lens holder 11 to be moved linearly. For example, in the housing 40, the driving module 70 drives the spectroscopic lens holder 11 to move in a horizontal direction and meanwhile to move linearly relative to the first imaging module 20 and the second imaging module 30. For example, when the first imaging module 20 and the second imaging module 30 are both stationary, and the spectroscopic lens holder 11 moves linearly in a horizontal direction or a vertical direction (left-right direction or up-down direction of FIG. 2). In another embodiment, the driving module 70 drives the spectroscopic lens holder 11 and the first imaging module 20 to synchronously move in a horizontal direction while the second imaging module 30 is stationary; or the driving module 70 drives the spectroscopic lens holder 11 and the second imaging module 30 to synchronously move in a horizontal direction while the first imaging module 20 is stationary. In this embodiment, the driving module 70 could be a linear driver, such as a stepper motor.

Figure 4:
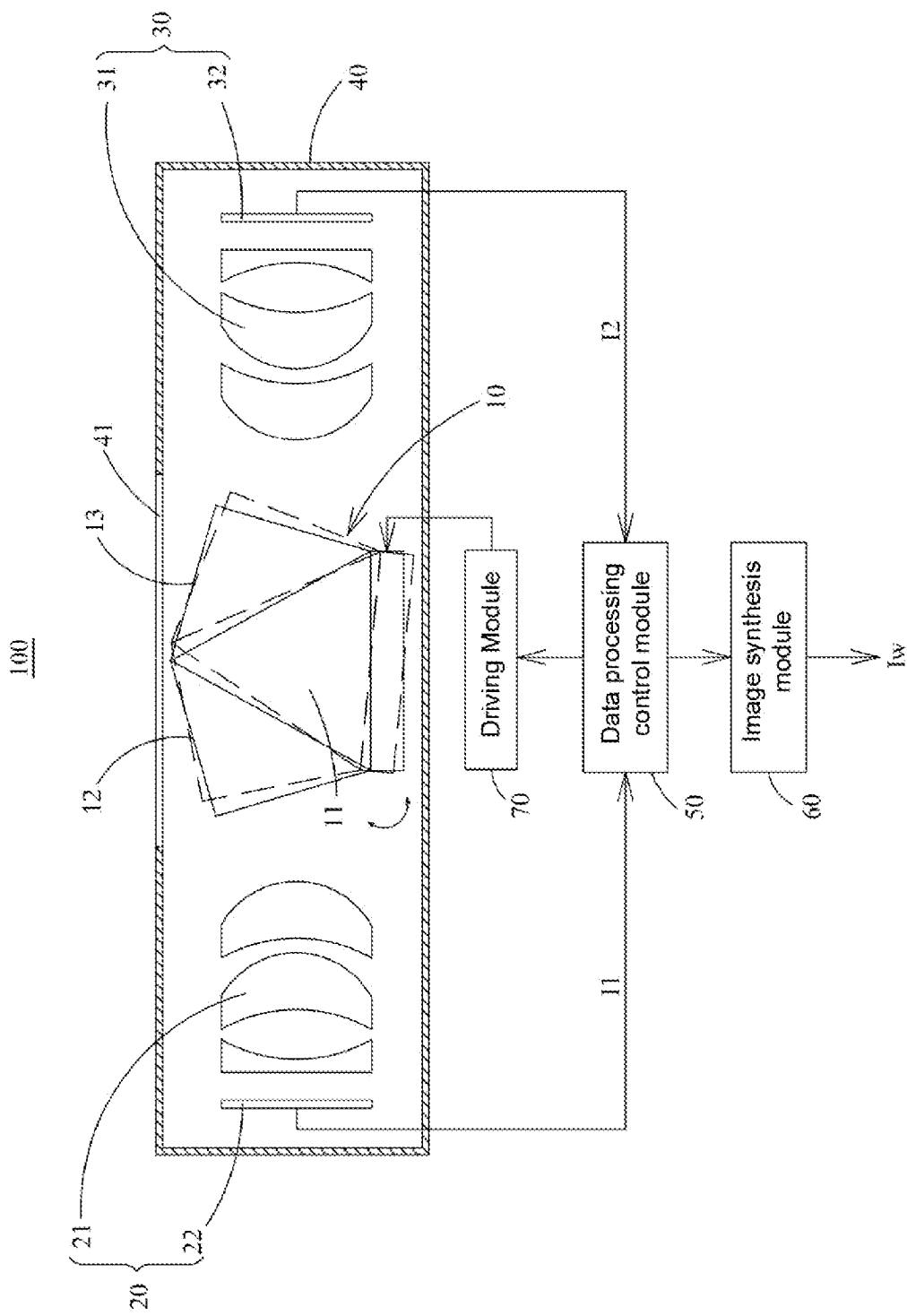
FIG. 4 is a use state diagram of a wide-angle camera of the third embodiment of the present disclosure.

FIG. 4 is a use state diagram of a wide-angle camera of the third embodiment of the present disclosure. Partial components of this embodiment are identical to those of the first embodiment, and the same components are given the same symbols, and descriptions are omitted. In this embodiment, the driving module 70 can drive the spectroscopic lens holder 11 to rotate. For example, in the housing 40, the driving module 70 drives the spectroscopic lens holder 11 to rotate in a clockwise or counterclockwise direction, while rotating relative to the first imaging module 20 and the second imaging module 30 at the same time. For example, the spectroscopic lens holder 11 rotates clockwise or counterclockwise while the first imaging module 20 and the second imaging module 30 are both stationary. In another embodiment, the driving module 70 drives the spectroscopic lens holder 11 and the first imaging module 20 to synchronously rotate in a clockwise or counterclockwise direction, while the second imaging module 30 is stationary; or, the driving module 70 drives the spectroscopic lens holder 11 and the second imaging module 30 to synchronously rotate in a clockwise or counterclockwise direction while the first imaging module 20 is stationary. In this embodiment, the driving module 70 could be a rotary driver, such as a voice coil motor.

Figure 5:
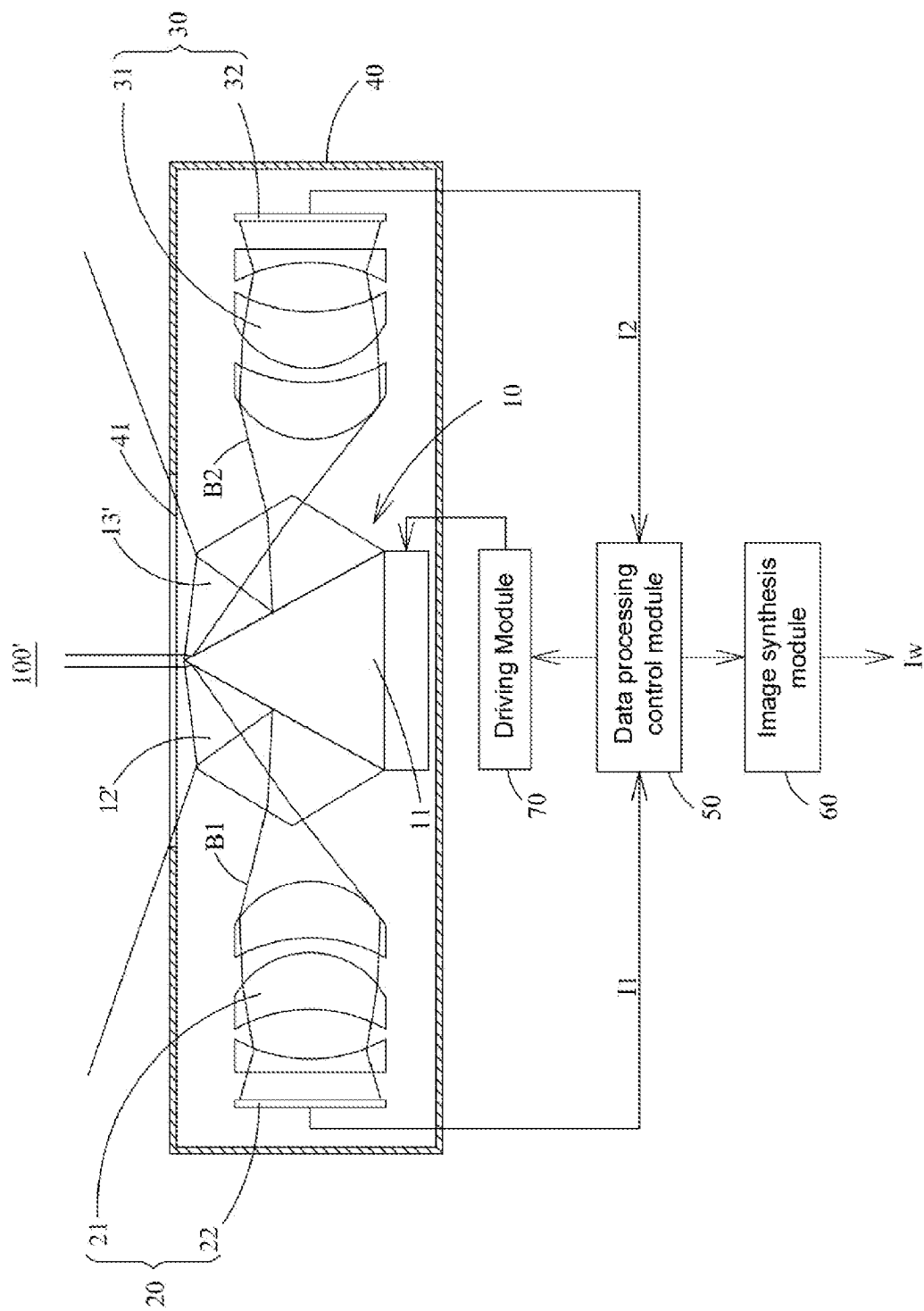
FIG. 5 is a perspective view of a wide-angle camera of the fourth embodiment of the present disclosure.

FIG. 5 is a perspective view of a wide-angle camera of the fourth embodiment of the present disclosure. Partial components of this embodiment are identical to those of the first embodiment, and the same components are given the same symbols, and descriptions are omitted.

The difference between the wide-angle camera 100' of this embodiment and that shown in FIG. 1 is that the first optical prism 12' and the second optical prism 13' of this embodiment are trapezoidal prisms, allowing the light path of the first light B1 and the second light B2 to be slightly adjusted to adapt to the first imaging module 20 and the second imaging module 30 having different structures. In addition to trapezoidal prisms, the first optical prism 12' and the second optical prism 13' can also be other specifically shaped prisms, such as pentagonal prisms.

Figure 6:
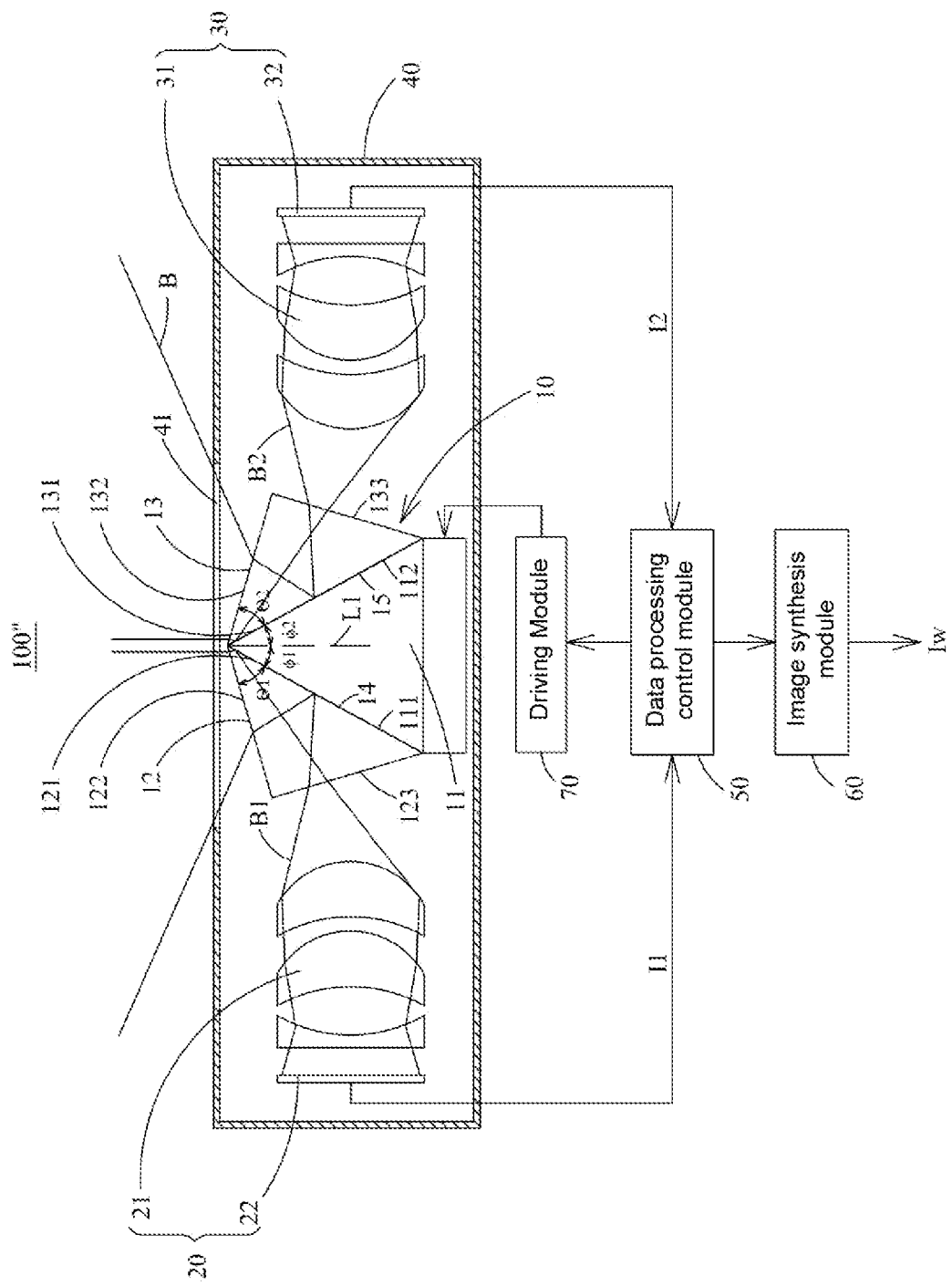
FIG. 6 is a use state diagram of a wide-angle camera of the fifth embodiment of the present disclosure.

FIG. 6 is a use state diagram of a wide-angle camera of the fifth embodiment of the present disclosure. Partial components of this embodiment are identical to those of the first embodiment, and the same components are given the same symbols, and descriptions are omitted. In this embodiment, the difference between the wide-angle camera 100" and that shown in FIG. 1 in that the spectroscopic module 10 of this embodiment further comprises a first reflective layer 14 and a second reflective layer 15. The first reflective layer 14 is disposed between the first optical prism 12 and the first sidewall 111, and the second reflective layer 15 is disposed between the second optical prism 13 and the second sidewall 112. After being reflected by the first reflective layer 14 and the second reflective layer 15, the external light B is split into a first light B1 and a second light B2. In this embodiment, the first reflective layer 14 and the second reflective layer 15 could be formed on the first reflective surface 121 and the second reflective surface 131, respectively. For example, forming a metal coating on the first reflective surface 121 and the second reflective surface 131. In another embodiment, the first reflective layer 14 and the second reflective layer 15 could be formed on the first sidewall 111 and the second sidewall 112 of the spectroscopic lens holder 11, respectively. For example, forming a metal coating on the first sidewall 111 and the second sidewall 112.

In summary, embodiments of the present disclosure provide a wide-angle camera to solve the problem of barrel distortion of wide-angle images by firstly splitting the external light into the first light B1 and the second light B2. Then the first light B1 and the second light B2 respectively image on the first imaging module 20 and the second imaging module 30 having narrow perspectives respectively generate a first image I1 and a second image I2. Finally, the first image and the second image are synthesized to a wide-angle image Iw, which presents no barrel distortion.

It is to be understood that the term "comprises", "comprising", or any other variants thereof, is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A wide-angle camera, comprising:
   a spectroscopic module comprising a spectroscopic lens holder, a first optical prism and a second optical prism, the first optical prism being disposed on a first sidewall of the spectroscopic lens holder, the second optical prism being disposed on a second sidewall of the spectroscopic lens holder, the first sidewall being opposite to the second sidewall, an external light being split into a first light and a second light correspondingly through the first optical prism and the second optical prism;
   a first imaging module corresponding to the first optical prism, and receiving the first light for generating a first image; and
   a second imaging module corresponding to the second optical prism, and receiving the second light for generating a second image;
   wherein the first image and the second image are synthesized into a wide-angle image; the spectroscopic module moves relative to the first imaging module or/and the second imaging module.

2. The wide-angle camera according to claim 1, wherein the spectroscopic module further comprises a first reflective layer and a second reflective layer; the first reflective layer is disposed between the first optical prism and the first sidewall; the second reflective layer is disposed between the second optical prism and the second sidewall; the external light reflected by the first reflective layer becomes the first light; the external light reflected by the second reflective layer becomes the second light.

3. The wide-angle camera according to claim 2, wherein the first reflective layer is disposed on a surface of the first optical prism facing the first sidewall or on the first side wall; the second reflective layer is disposed on a surface of the second optical prism facing the second sidewall or on the second sidewall.

4. The wide-angle camera according to claim 2, wherein the first optical prism further comprises a first incident surface; the first incident surface and the first reflective layer form a first angle; the second optical prism further comprises a second incident surface; the second incident surface and the second reflective layer form a second angle.

5. The wide-angle camera according to claim 4, wherein the first angle is between 30 degrees and 60 degrees; the second angle is between 30 degrees and 60 degrees.

6. The wide-angle camera according to claim 5, wherein the first angle is 45 degrees.

7. The wide-angle camera according to claim 5, wherein the second angle is 45 degrees.

8. The wide-angle camera according to claim 6, wherein the second angle is 45 degrees.

9. The wide-angle camera according to claim 1, wherein the first sidewall and the light incident direction of the wide-angle camera form a first inclination angle; the second sidewall and the light incident direction of the wide-angle camera form a second inclination angle.

10. The wide-angle camera according to claim 9, wherein the first inclination angle is equal to the second inclination angle.

11. The wide-angle camera according to claim 1 further comprising a driving module driving the spectroscopic module to move.

12. The wide-angle camera according to claim 11, wherein the driving module comprises a linear driver driving the spectroscopic module to linearly move relative to the first imaging module or/and the second imaging module.

13. The wide-angle camera according to claim 11, wherein the driving module comprises a rotary driver driving the spectroscopic module to rotate relative to the first imaging module or/and the second imaging module.

14. The wide-angle camera according to claim 1, wherein the first imaging module comprises a first light sensor; the second imaging module comprises a second light sensor.

15. The wide-angle camera according to claim 14, wherein the first light sensor is a color light sensor, a monochromatic light sensor, or a time-of-flight sensor.

16. The wide-angle camera according to claim 14, wherein the second light sensor is a color light sensor, a monochromatic light sensor, or a time-of-flight sensor.

* * * * *